United States Patent [19]

Dürschmidt et al.

[11] Patent Number: 5,490,414
[45] Date of Patent: Feb. 13, 1996

[54] METHOD FOR DETECTING LEAKS IN A MOTOR VEHICLE TANK VENTILATION SYSTEM

[75] Inventors: Ferry Dürschmidt, Friolzheim; Wolfgang Strauss, Denkendorf, both of Germany

[73] Assignee: Mercedes-Benz AG., Stuttgart, Germany

[21] Appl. No.: 310,425

[22] Filed: Sep. 22, 1994

Related U.S. Application Data

[63] Continuation-in-part of Ser. No. 107,523, Aug. 17, 1993, abandoned.

[30] Foreign Application Priority Data

Aug. 21, 1992 [DE] Germany ............... 42 27 698.5

[51] Int. Cl.[6] .................................................. F02M 33/02
[52] U.S. Cl. ..................... 73/49.2; 73/118.1; 123/520
[58] Field of Search ................. 73/40, 49.2, 49.3, 73/49.7, 117.3, 118.1, 40.5, 46, 49.8, 40.7; 123/520

[56] References Cited

U.S. PATENT DOCUMENTS

| | | | |
|---|---|---|---|
| 5,146,902 | 9/1992 | Cook et al. | 73/118.1 |
| 5,193,512 | 3/1993 | Steinbrenner et al. | 123/520 |
| 5,197,442 | 3/1993 | Blumenstock et al. | 123/520 |
| 5,220,896 | 6/1993 | Blumenstock et al. | 123/520 |
| 5,239,858 | 8/1993 | Rogers et al. | 73/118.1 |
| 5,267,470 | 12/1993 | Cook | 73/49.7 |
| 5,297,527 | 3/1994 | Suzuki et al. | 123/520 |
| 5,315,980 | 5/1994 | Otsuka et al. | 123/520 |
| 5,339,788 | 8/1994 | Blumenstock et al. | 123/520 |
| 5,398,661 | 3/1995 | Denz et al. | 123/520 |

*Primary Examiner*—Hezron E. Williams
*Assistant Examiner*—Richard A. Moller
*Attorney, Agent, or Firm*—Klaus J. Bach

[57] ABSTRACT

In a method for detecting leaks in a motor vehicle tank ventilation system which includes an adsorption filter connected to the tank, via a ventilation conduit, to the induction pipe of an internal combustion engine via a discharge conduit and to the atmosphere via an air supply conduit, a shut-off valve arranged in the air supply conduit is closed to isolate the system from the atmosphere, a regeneration valve arranged in the discharge conduit is then opened so as to generate in the system a predetermined vacuum up to a point of time at which a stable equilibrium state of the air/fuel ratio in the system is achieved, the regeneration valve is then closed to isolate the system also from the induction pipe, and the vacuum in the system is subsequently maintained over a predetermined period and the existence of a leak in the tank ventilation system is indicated if the vacuum in the system falls below a predetermined threshold value during the predetermined monitoring period.

6 Claims, 3 Drawing Sheets

METHOD FOR DETECTING LEAKS IN A MOTOR VEHICLE TANK VENTILATION SYSTEM

This is a continuation-in-part application of U.S. application Ser. No. 08/107,523, filed Aug. 17, 1993, now abandoned and claiming priority of German Application P 42 27 698.5 of Aug. 21, 1992.

BACKGROUND OF THE INVENTION

The invention relates to a method for detecting leaks in a motor vehicle tank ventilation system.

A tank ventilation system consists of a fuel tank and an adsorption filter, generally an activated carbon filter, which are connected to one another by means of a ventilation conduit. The adsorption filter is connected to the atmosphere via an air conduit, which can be shut off by means of a shut-off valve, and is connected to the induction pipe of the internal combustion engine via a discharge conduit, which can be controlled by means of a regeneration valve. When the internal combustion engine is in operation and the shut-off valve and regeneration valve are open, the fuel vapors released from the fuel are induced into the induction pipe by the vacuum present therein. This process, furthermore, also disposes of the fuel vapors temporarily stored in the adsorption filter so that the adsorption filter is regenerated. When the vehicle is parked, the tank system is ventilated via the adsorption filter, in which the released fuel vapors are temporarily stored by chemical means.

As part of the stringent requirements of the American environmental authorities, measuring methods are required by which leaks in the fuel ventilation systems of vehicles can be detected.

Such a method is, for example, known from the German Patent Specification DE-A 40 03 751. In the method disclosed therein a pressure sensor is used to check whether a vacuum is maintained in the tank ventilation system when the shut-off valve is closed and the regeneration valve is open.

This method has the disadvantage that the vacuum generated in the tank ventilation system by the induction pipe vacuum is not constant but, rather, depends on various engine operating parameters. Consequently, a fault recognized when a predetermined pressure limit is exceeded can only be a rough determination. Small leaks cannot be recognized by this method.

In addition, a test method for liquid tanks is known from U.S. Pat. No. 4,442,702 in which a predetermined vacuum is generated in the tank and the pressure change is subsequently recorded with the valves closed. In a second step, a positive pressure is then applied to the tank and, with the valves likewise closed, the pressure change is again recorded. Conclusions are drawn regarding the leak-tightness of the tank system by comparing the slopes of the two pressure curves.

Although this method takes into account the fact that the pressure change in a closed tank system depends on the saturation vapor pressure of the liquid stored in the tank and therefore on parameters depending on the state of the liquid, the method has the disadvantage that additional equipment is necessary for generating a positive pressure in the tank system. This method is therefore too complicated and too expensive for use in a motor vehicle.

Accordingly it is the object of the present invention to provide a method for determining leaks in a motor vehicle tank ventilation system by which even relatively small leaks in a tank ventilation system can be reliably recognized in a simple manner.

SUMMARY OF THE INVENTION

In a method for detecting leaks in a motor vehicle tank ventilation system which includes an adsorption filter connected to the tank, via a ventilation conduit, to the induction pipe of an internal combustion engine via a discharge conduit and to the atmosphere via an air supply conduit, a shut-off valve arranged in the air supply conduit is closed to isolate the system from the atmosphere, a regeneration valve arranged in the discharge conduit is then opened and controlled so as to generate in the system a predetermined vacuum up to a point of time at which a stable equilibrium state of the air/fuel vapor ratio in the system has been achieved, the regeneration valve is then closed to isolate the system also from the induction pipe such that the predetermined vacuum in the system is subsequently maintained over a predetermined period if there is no leak in the system and the existence of a leak in the tank ventilation system is indicated if the vacuum in the system falls below a predetermined threshold value during the predetermined monitoring period.

DESCRIPTION OF THE PREFERRED EMBODIMENT

Figure 1:
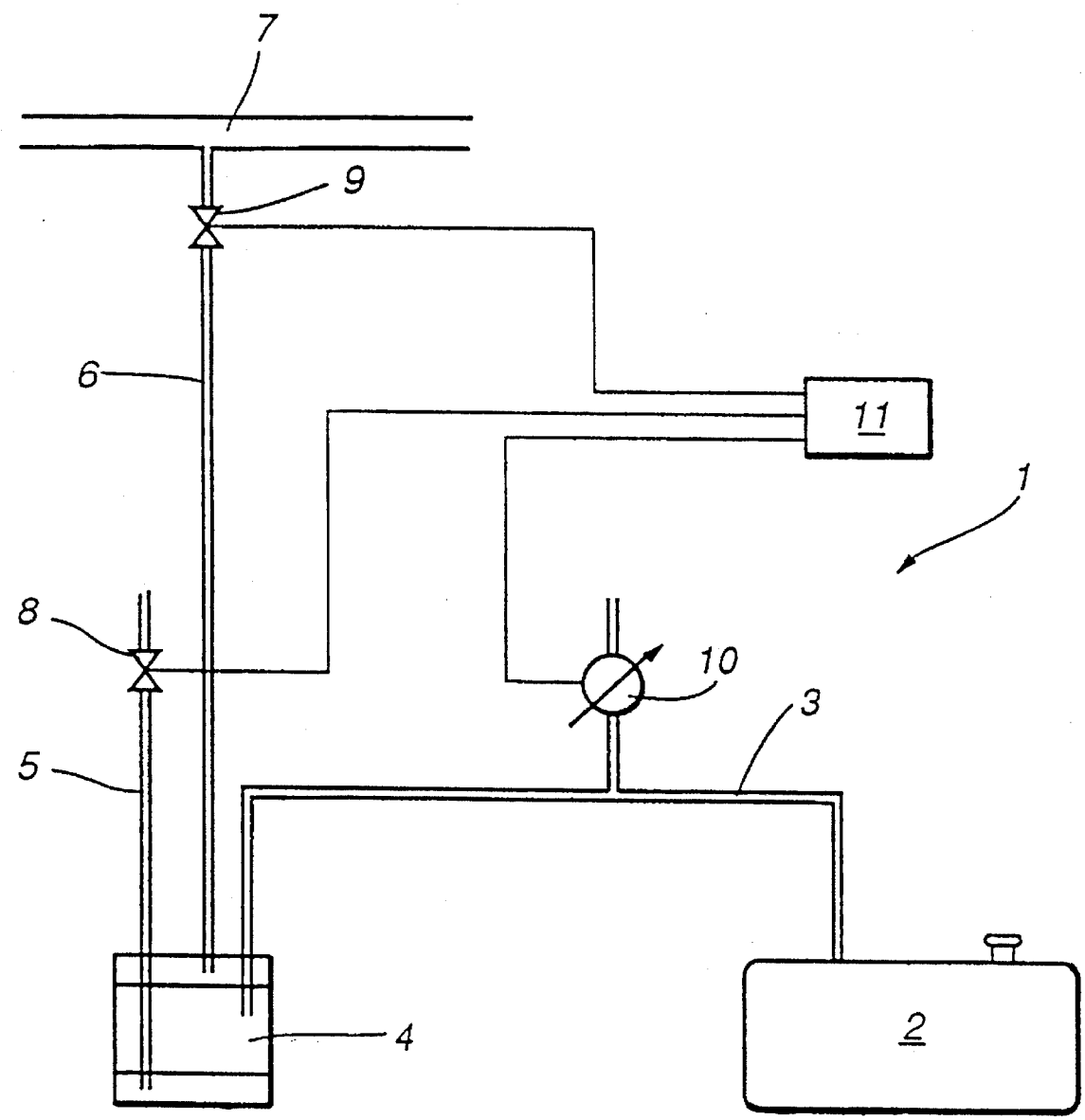
FIG. 1 is a diagrammatic representation of a motor vehicle tank ventilation system.

FIG. 1 shows a motor vehicle tank ventilation system, indicated overall by numeral 1. It consists of a fuel tank 2, which is connected to an adsorption filter 4 via a ventilation conduit 3. The adsorption filter 4 is in turn in communication with the atmosphere via an air supply conduit 5 and is connected to an induction pipe 7 of an internal combustion engine (not shown) via a discharge conduit 6. A shut-off valve 8 is arranged in the air supply conduit 5. In addition, a controllable regeneration valve 9 which can be controlled as to how much it is opened or closed is provided in the discharge conduit 6 to permit control of the vacuum maintained in the system and a differential pressure sensor 10 is provided in the ventilation conduit 3 to determine the pressure in the ventilation conduit, that is, the difference between ambient pressure and the pressure in the ventilation conduit. A control unit 11, to which is supplied as an input parameter the pressure $P_T$ determined in the tank ventilation system 1 by the differential pressure sensor 10, is used to control the valves 8, 9.

In normal operation of the internal combustion engine, both valves 8, 9 are open so that the fuel vapors released from the fuel tank 2 are drawn off by the vacuum present in the induction pipe 7. In addition, fresh air can be induced via the air supply conduit 5 by the vacuum in the induction pipe 7 so that fuel vapors possibly stored in the adsorption filter 4 are scavenged and, therefore, the adsorption filter 4 is regenerated. When the vehicle is not operated, the shut-off valve 8 remains open whereas the regeneration valve 9 is closed. The fuel tank 2 is then still ventilated to the environment (pressure $P_N$) while any fuel vapors discharged from the tank are conducted through the adsorption filter 4 where they are retained by chemical means so that they are not released into the environment. An activated carbon filter is generally used as the adsorption filter 4.

Figure 2:
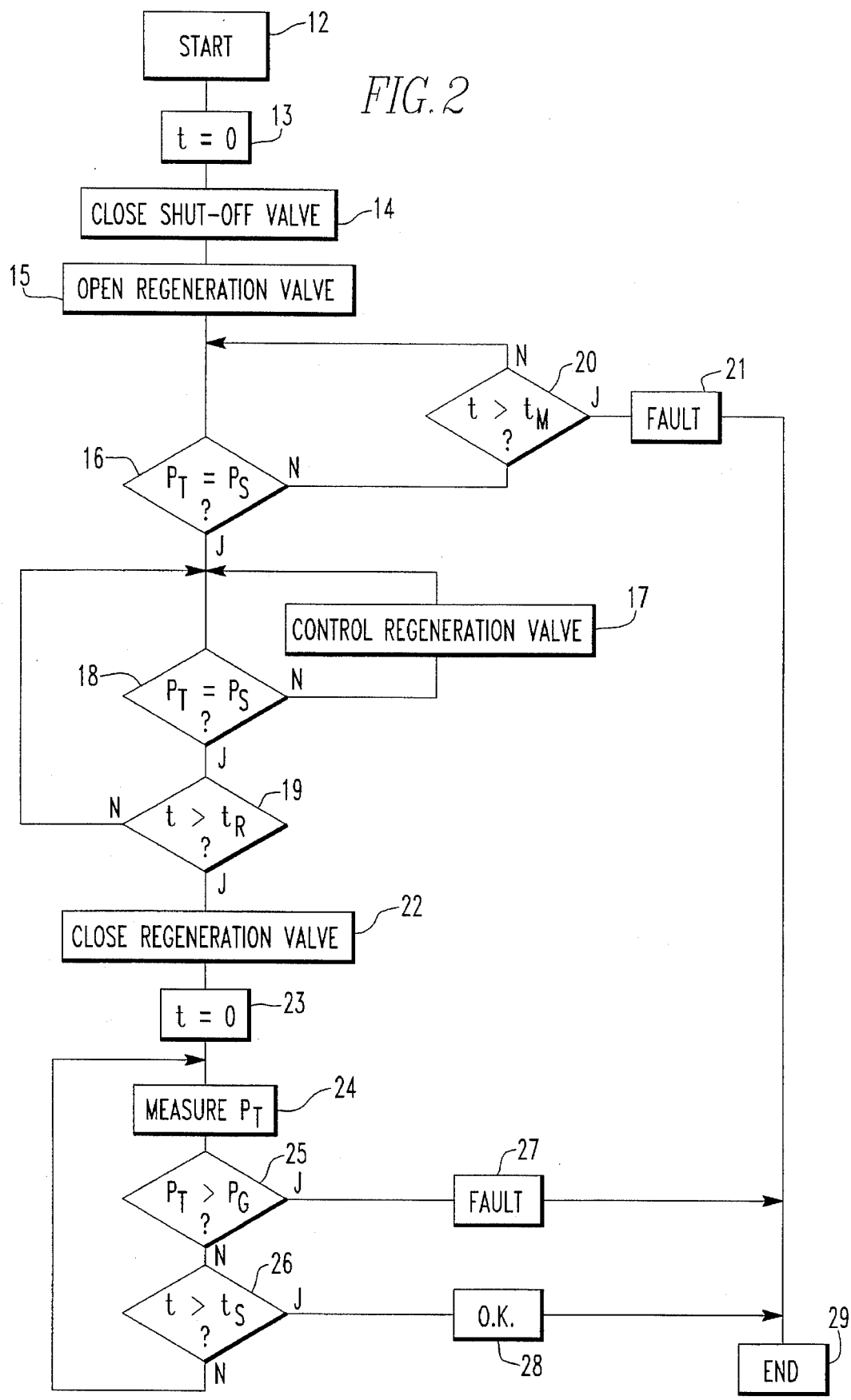
FIG. 2 is a flow chart of the method according to the invention.

A flow chart of the method according to the invention for determining leaks in a motor vehicle tank ventilation system is shown in FIG. 2. After the start of leak inspection in block 12 a time measurement is initiated in block 13 and the shut-off valve 8 is closed in block 14. The regeneration valve 9 is subsequently opened in block 15 for generating a predetermined vacuum $P_N - P_S$ (the difference between ambient pressure $P_N$ and desired system pressure $P_S$) in the tank ventilation system 1. Then it is determined in blocks 16, 20, 21 if the predetermined ventilation system pressure has been reached within a first predetermined measurement period $t_M$. If this is not the case a fault is recognized in block 21 and a fault report is generated, that is, the existence of a large leak in the tank ventilation system 1 is indicated. Upon detection of a large leak the leak determination procedure is subsequently terminated in block 29.

If there is no large leak the pressure reduction caused by the opening of the regeneration valve 9 in block 15 brings the air/fuel vapor mixture to an unstable state. The pressure reduction as such does not change the air/fuel vapor mixture at first, but the vapor generation rate of the fuel changes resulting, over time, in a change of the air/fuel vapor ratio. For the detection of small leaks in the tank ventilation system 1 it is however necessary that a stable air/fuel vapor mixture has developed before the leak testing procedure can be initiated.

If the pressure $P_S$ in the ventilation system is reached within the predetermined measurement period $t_M$, the pressure $P_T$ in the system is adjusted to the pressure $P_S$ over a predetermined period of time $t_R$ in order to suction off fuel vapors developing as a result of the pressure reduction. The time period $t_R$, which may be, for example, 30–60 seconds, is determined, for example, by subjecting a sealed tank ventilation system to a pressure $P_S$ and then determining —without adjustment—the time required for the pressure in the tank ventilation system to remain constant.

If the pressure $P_T$ measured in block 18 does not coincide with the predetermined pressure $P_S$, the procedure branches to block 17 where the pressure $P_T$ is adjusted to the predetermined pressure $P_S$ by opening or closing the regeneration valve 9. If the pressure $P_T$ measured in block 18 equals the predetermined pressure $P_S$ it is subsequently checked in block 19 whether the predetermined adjustment period $t_R$ has passed. If this is not the case the procedure is returned to the beginning of block 18. However if in block 19 the adjustment period $t_R$ has already passed, the procedure goes on to block 22, where the regeneration valve 9 is firmly closed and then to block 23 in which a new time measurement is initiated.

In block 24 the pressure $P_T$ in the tank ventilation system 1 is measured over time, that is, the vacuum in the system is monitored by means of the differential pressure sensor 10 and is evaluated in the control unit 11. Because the air/fuel vapor mixture is now in a state of stable equilibrium, the pressure $P_T$ in the closed tank ventilation system 1 should remain constant. The pressure $P_T$ can only increase if outside air can enter the system, that is, if the tank ventilation system 1 is leaking. Consequently, in block 25 it is determined whether the pressure $P_T$ exceeds a pressure limit $P_G$. If this is the case, a fault is recognized in block 27 and a fault report is generated, that is, the existence of a small leak in the tank ventilation system is indicated. The checking procedure is then terminated in block 29. If, on the other hand, the pressure $P_T$ is smaller than the pressure limit $P_G$ in block 25, then block 26 checks whether a predetermined measurement duration $t_S$ has elapsed. If this is the case an O.K. report is generated in block 28, that is, information is generated in the control unit 11 that the tank ventilation system 1 does not leak. The checking procedure is then terminated in block 29. If, on the other hand, the predetermined measurement duration $t_S$ has not yet elapsed in block 26 the system returns the procedure to the beginning of block 24.

As already described above, it is essential to the method that, for determining small leaks, the pressure reduction in the tank ventilation system 1 will take place in such a manner that, after the pressure reduction, the air/fuel vapor mixture is in a stable state of air/fuel vapor ratio before the start of the determination of the pressure over time value. Because fuel pressure builds up as a function of temperature and external pressure due to the fuel's vapor pressure behavior, a small leak cannot be easily recognized by a simple pressure test. Influences such as fuel temperature, fuel level, fuel quality or mechanical motion of the fuel tank can hide the influence of the leak. If, however, the air/fuel vapor mixture is in a stable equilibrium condition at a defined vacuum $P_N - P_S$, for example, 10 hPa, before the start of monitoring of the pressure change, the subsequent gas generation rate is minimal. In the case of a measurement over a longer duration $t_S$, for example, above 60 seconds, a substantial increase in pressure can only be caused by a leak. 50% of the vacuum $P_N - P_S$ applied, i.e., in this case 5 hPa, may be specified, for example, as the pressure limit $P_G$.

Various possibilities exist for maintaining a stable equilibrium condition at the end of the pressure reduction. The pressure can, for example as described above, be reduced rapidly to the desired equilibrium pressure $P_S$ and then maintained at this pressure $P_S$ for a predetermined period of time $t_R$ or the pressure reduction can take place very slowly so that the air/fuel vapor mixture has sufficient time to establish a respective new equilibrium condition while the pressure is reduced.

Figure 3:
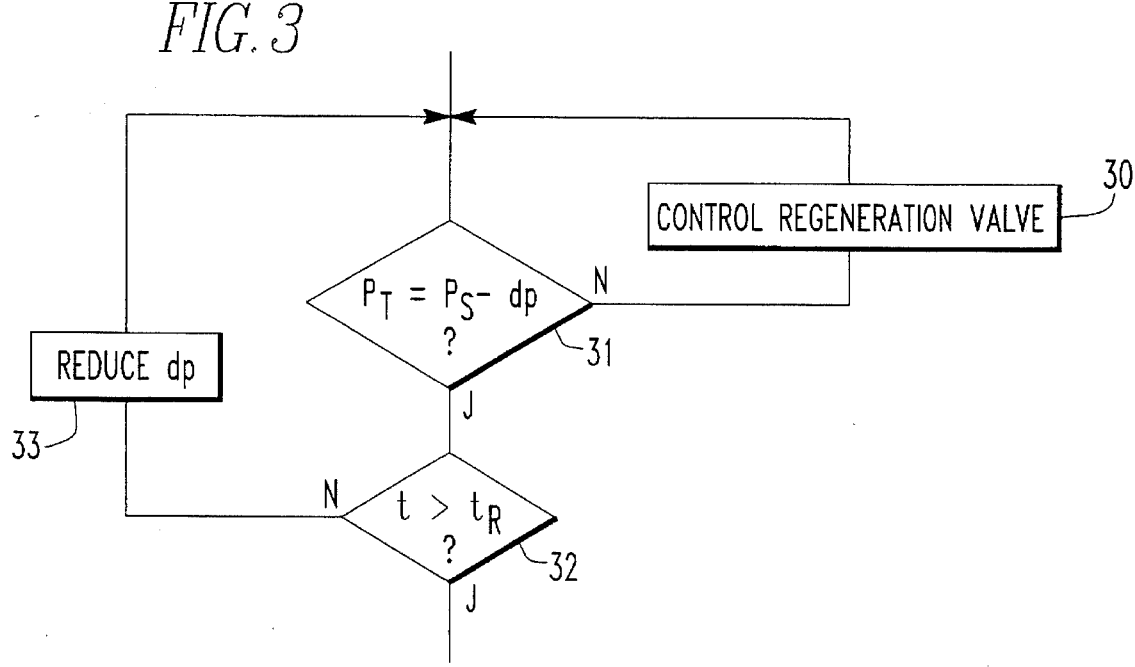
FIG. 3 shows a portion of the flow chart of FIG. 2 for a slightly modified procedure.
Figure 4:
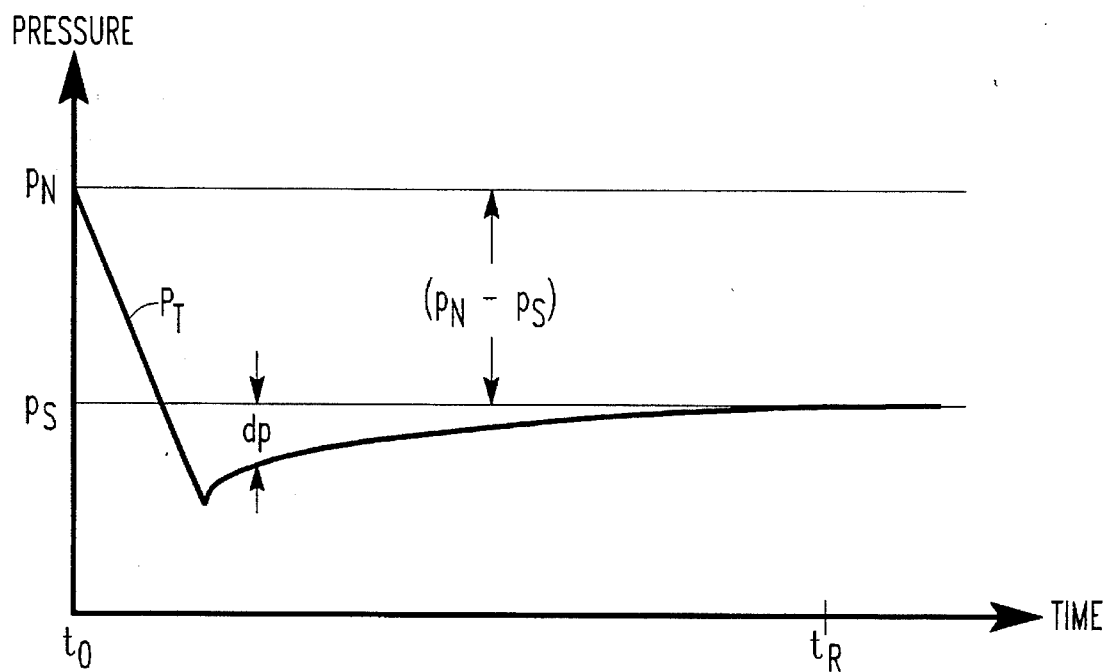
FIG. 4 shows the system pressure generated by the modification which results in a shorter time requirement for obtaining equilibrium pressure.

Another possibility, which is advantageous for use in vehicles, is to undertake the controlled pressure reduction by means of the control unit 11. In this case, the pressure reduction process can take place in a manner optimized with respect to time. For this reason, the blocks 17–19 in FIG. 2 are replaced by blocks 30–33 of FIG. 3. An example for the curve of the predetermined vacuum $P_T = P_N - P_S + dp$ is illustrated in FIG. 4. In a first stage, a rapid and slightly greater reduction in pressure than required to achieve the predetermined vacuum $P_N - P_S$ may be initiated to a pressure level $P_S - dp$. The pressure in the tank ventilation system 1 is subsequently controlled exactly to the specified pressure $P_S - dp$ for a predetermined time $t_R$ by controlling the opening angle of the regeneration valve 9. Within the predetermined time $t_R$ the value of the differential pressure dp is successively reduced (block 33) to zero. Therefore the air/fuel vapor mixture is in a stable condition at the predetermined vacuum $P_N - P_S$ at the conclusion of the pressure control procedure (block 33).

What is claimed is:

1. A method for detecting leaks in a motor vehicle tank ventilation system including a fuel tank, an adsorption filter in communication with said fuel tank via a ventilation conduit, a differential pressure sensor arranged in the ventilation conduit, an air supply conduit connecting said adsorption filter with the atmosphere and having a shut-off valve arranged therein, a discharge conduit connecting said adsorption filter to an induction pipe of an internal combustion engine and including a controllable regeneration valve, and a control unit for controlling the valves, said differential pressure sensor being connected to said control unit for relating thereto the pressure sensed in said ventilation conduit, said method comprising the steps of:

closing said shut-off valve so as to isolate said system from the atmosphere, opening and controlling said regeneration valve so as to generate in said system a reduction of the pressure while the air/fuel vapor ratio changes until a predetermined vacuum is generated and to maintain said predetermined vacuum up to a point of time at which a stable equilibrium state of the air/fuel vapor ratio in the system is achieved, then closing said regeneration valve to isolate said system also from said induction pipe, monitoring the vacuum in said system over a predetermined period and indicating the existence of a leak in the tank ventilation system if the vacuum in said system falls below a predetermined threshold value during said predetermined period.

2. A method according to claim 1, wherein the existence of a major leak is indicated if said predetermined vacuum cannot be generated.

3. A method for detecting leaks in a motor vehicle tank ventilation system including a fuel tank, an adsorption filter in communication with said fuel tank via a ventilation conduit, a differential pressure sensor arranged in the ventilation conduit, an air supply conduit connecting said adsorption filter with the atmosphere and having a shut-off valve arranged therein, a discharge conduit connecting said adsorption filter to an induction pipe of an internal combustion engine and including a controllable regeneration valve, and a control unit for controlling the valves, said differential pressure sensor being connected to said control unit for relating thereto the pressure sensed in said ventilation conduit, said method comprising the steps of:

closing said shut-off valve so as to isolate said system from the atmosphere, opening said regeneration valve to provide for communication between said engine induction pipe in which a vacuum is maintained during engine operation, and said adsorption filter and controlling said regeneration valve to reduce the pressure in the tank ventilation system so as to generate in said system a predetermined vacuum, maintaining said predetermined vacuum for a predetermined control period after which a stable equilibrium of the air/fuel vapor ratio in the system is achieved, then closing said regeneration valve to isolate said system also from said induction pipe, monitoring the vacuum in said system over a predetermined period and indicating the existence of a leak in the tank ventilation system if the vacuum in said system falls below a predetermined threshold value during said predetermined period.

4. A method according to claim 3, wherein the existence of a major leak is indicated if said predetermined vacuum cannot be generated.

5. A method for detecting leaks in a motor vehicle tank ventilation system including a fuel tank, an adsorption filter in communication with said fuel tank via a ventilation conduit, a differential pressure sensor arranged in the ventilation conduit, an air supply conduit connecting said adsorption filter with the atmosphere and having a shut-off valve arranged therein, a discharge conduit connecting said adsorption filter to an induction pipe of an internal combustion engine and including a controllable regeneration valve, and a control unit for controlling the valves, said differential pressure sensor being connected to said control unit for relating thereto the pressure sensed in said ventilation conduit, said method comprising the steps of:

closing said shut-off valve so as to isolate said system from the atmosphere, opening said regeneration valve while the air/fuel vapor ratio changes so as to provide in said system a reduction of pressure to achieve a vacuum that is greater than a predetermined vacuum, and controlling said regeneration valve over a predetermined control period, after which a stable equilibrium state of the air/fuel vapor ratio in the system is achieved, so as to maintain the pressure in said system, such that the vacuum is reduced from the initial value to the predetermined vacuum within said predetermined control period, then closing said regeneration valve to isolate said system also from said induction pipe, monitoring the vacuum in said system over a predetermined period and indicating the existence of a leak in the tank ventilation system if the vacuum in said system falls below a predetermined threshold value during said predetermined period.

6. A method according to claim 5, wherein the existence of a major leak is indicated if said predetermined vacuum cannot be generated.

* * * * *